United States Patent [19]

Schmittmann et al.

[11] 4,438,028

[45] Mar. 20, 1984

[54] FIRE RETARDANT AND COMPOUNDS BASED THEREON

[75] Inventors: Hans-Bernd Schmittmann, Langenhorster Str. 30, 5620 Velbert, Fed. Rep. of Germany; Alfons Thier, Rosbach, Fed. Rep. of Germany

[73] Assignees: Charles M. Wiersma; Jack G. Wiersma, both of Grand Rapids, Mich. ; by said Alfons Thier

[21] Appl. No.: 338,544

[22] Filed: Jan. 11, 1982

[30] Foreign Application Priority Data

Jan. 12, 1981 [DE] Fed. Rep. of Germany ....... 3100626

[51] Int. Cl.³ .............................................. C09K 3/28
[52] U.S. Cl. ................................. 252/609; 106/18.13; 106/18.14; 252/601; 428/921; 521/103; 521/106; 521/906; 521/907
[58] Field of Search ............................ 106/18.13, 18.14; 252/601, 609; 260/DIG. 24; 521/103, 106, 906, 907

[56] References Cited

U.S. PATENT DOCUMENTS

| | | | |
|---|---|---|---|
| 4,097,400 | 6/1978 | Wortmann et al. | 252/609 |
| 4,122,203 | 10/1978 | Stahl | 252/609 |
| 4,182,799 | 1/1980 | Rodish | 252/609 |
| 4,224,169 | 9/1980 | Retana | 252/609 |
| 4,243,579 | 1/1981 | Keogh | 252/609 |
| 4,279,652 | 7/1981 | Ciaperoni et al. | 252/609 X |
| 4,297,252 | 10/1981 | Caesar et al. | 252/606 |

*Primary Examiner*—Leland A. Sebastian
*Attorney, Agent, or Firm*—Price, Heneveld, Huizenga & Cooper

[57] ABSTRACT

The specification discloses a fire retardant composition, a plastic based thereon, a process making for same and a building component based thereon wherein the fire retardant comprises chemicals which when added to the plastic resin composition will undergo fractional, endothermic reactions under the action of high temperatures. The most preferred chemicals disclosed in the specification, and their proportions relative to one another, comprise from about 2 to about 10% by weight of ammonium polyphosphate, from about 10 to about 50% by weight of monoammonium phosphate, from about 4 to about 12% by weight of anhydrous borax, from about 12 to about 40% by weight of borax, and from about 12 to about 40% by weight of a urea polymer, preferably melamine. Other additives may be included and are disclosed in the specification.

87 Claims, 1 Drawing Figure

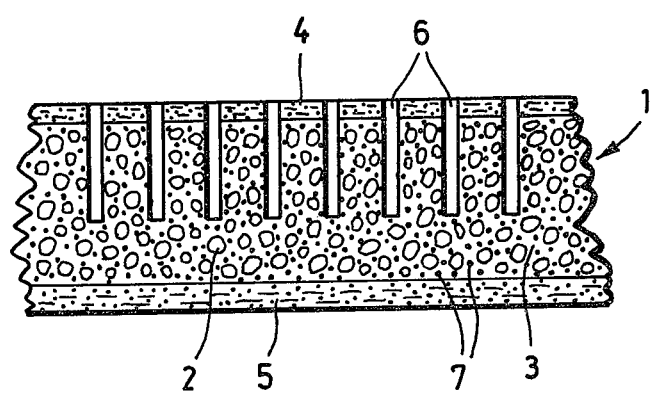

FIRE RETARDANT AND COMPOUNDS BASED THEREON

BACKGROUND OF THE INVENTION

The invention relates a fire retardant and compounds based thereon such as to flameproof or fire retardant plastic, coatings and the like. Such plastics are usable for example as building materials, in seating, or the like. Coatings or stains could be useful in making an underlying substrate more fire resistant.

Building materials and building components of plastics are frequently utilized for the interior construction of renovated rooms. For example, wall protection panels, wall protection strips, handrails and like building elements of semi-hard or soft, flexible and elastic plastic foams are used for lining of walls, recesses, wall projections, swinging doors or the like, in particular in gymnasiums and sports halls or hospitals. Development in this field has led to building elements which are as a rule resistant to impact, scratching, abrasion and breakage and also nearly decay-proof, ageing-resistant against acids and alkalis, free from odor, and also developing no gases. They can be colored and cut or sawn, and are adhered to, e.g., concrete, masonry, wood or plaster with special adhesives. They are washable and easy-care.

Sound-absorbing elements can also be made of said building materials, so that the building materials have very versatile uses for the interior structure of spaces. Particularly outstanding building components in the above sense are, for example, described in Deutsche Gebrauchsmuster (DE-GM) 75 30 775. These are constructed of a foamed plastic core with relatively dense, thin surface layers of the same plastic material, the surface layers or edge zones being materially connected to the core. Such a building element preferably consists of a semi-hard or soft, elastic, flexible, foamed and solidified polyurethane, the surface layers having the same material, namely polyurethane. The polyurethane is foamed during the production of the building element in a mold in a conventional manner. For such building elements made of polyurethane it is to be emphasized that they have quite excellent heat-insulating properties.

The building materials described can, of course, also be used for cushioning, for protection or for decoration or the like for other elements such as, e.g., furniture or appliances or the like and thereby fulfill the same or other objectives. Similarly, the fire retardant of the present invention can be used in coatings and stains.

The usability of many materials such as building materials, seating cushions, and the like can be problematic in cases in which high flame retardancy is required or desired. For example, a flameproof material according to DIN 4102 Building Material Class B1, a West German designation, is very difficult to obtain in plastic. According to DIN 4102, and comparable codes in other countries, the burning behavior of building materials and building components is standardized, the building materials being divided into two main classes. Main Class A relates to incombustible materials. Main Class B contains, in contrast, the combustible building materials. The building materials with which the present invention is concerned fall into Building Material Class B. This class is further divided, according to the West German standard, into the following subclasses:

B1 Flameproof building materials
B2 Normally inflammable building materials
B3 Easily inflammable building materials.

The described, known building materials as a rule belong to the easily or normally inflammable building materials and are thus counted in Classes B2 and B3. Only a few plastics building materials are flameproof (Class B1) and even fewer are incombustible (Class A).

The object of the invention is to make easily inflammable and/or normally inflammable plastics materials flameproof, so that building components or other items produced from them satisfy the conditions of the West German DIN 4102 standard, and comparable standards in other countries, and can be classified in Class B1.

It is known that building materials of plastics, in particular, of polyurethane foam, can be made flameproof when asbestos is used as a filler. The processing of asbestos is however partially prohibited, due to the danger of asbestos, so that the use of building material parts utilizing asbestos is no longer permitted. In addition, the filler causes a hardening of the plastic foam, so that some desirable properties such as flexibility and elasticity of the building components can be lost. Research on the use of other fireproof fillers has up to now been abortive. None of the products satisfied the requirements of the DIN 4102 or any comparable standard.

It is further known to reduce the inflammability of plastics by the addition of chemicals. For example, phosphates or borates are used, mixed into the plastic mass. These measures in fact lead to more difficult flammability. However even this is not substantial enough to fulfill the requirements for the building materials, e.g., the conditions of the West German DIN 4102 standard. Possibly building materials of the kind described can be produced which are sufficient for Class B2. Inorganics such as antimony trioxide are also used, but are expensive.

The object of the invention is to provide fire retardant plastics, which can be produced easily and without danger, and which are sufficient for Class B1 of DIN 4102, and comparable tests in other countries, without the desired advantageous properties of the plastics being substantially impaired or lost.

SUMMARY OF THE INVENTION

This object is achieved by adding to a plastic or other composition, chemicals which undergo fractional endothermic reactions under the action of heat over a wide range of temperatures. The term fractional endothermic reaction refers broadly to fractional melting and/or fractional decomposition and/or fractional chemical reaction, which absorbs heat. The first endothermic reaction is advantageously to begin at about the melting point and/or ignition point of the plastic.

This is preferably achieved by adding to the plastic composition ammonium polyphosphate, monoammonium phosphate, an anhydrous inorganic compound capable of hydration, most preferably anhydrous borax, an inorganic compound which releases water when heated, most preferably borax decahydrate, and a urea polymer, most preferably melamine.

The term 'fractional', in the sense of the invention, refers to the reaction behavior of the material in temperature stages, e.g., melting, in which melt phases, for example, are formed at different temperatures from the solid of which, e.g., a building part or other plastic member or surface is composed. The melt phases, which occur in temperature stages or at different temperatures, are to arise, according to the invention, from endothermic reactions, so that heat energy is consumed. The same holds for decomposition reactions and the reactions for formation of new compounds or phases, these being endothermic processes according to the invention, consuming heat. The endothermic reactions are preferably to occur in succession, as for example a decomposition product being formed at 90° C. with consumption of a given amount of heat. When the decomposition product has been formed in a nearly complete amount, the temperature in the building material or in the decomposition zone rises. On reaching, for example, 100° C., a melt phase results, mainly in the decomposition zone, and again occurs endothermally and can form as long as the melting is available in the building material or in the decomposition zone. After this, the temperature in the reaction zone further rises until the next endothermic reaction provided occurs, which can be a phase change, e.g., a solid state reaction. The endothermic reactions can, of course, also all be melting processes or solid state or decomposition or other reactions; it depends here solely on the required temperatures for initiation of the processes being stepped in height and on sufficient heat energy being consumed, so that the plastic material is not heated so much below or behind or in the region of the reaction zone that the reaction zone, which acts as a protective zone, flows away or slips off or floats off. A building material, for example, made from polyurethane and containing the fire retardant of the present invention thus immediately fulfills the conditions of the West German DIN 4102 standard for the Class B1 and in practice also resists high temperatures for a given time.

The invention preferably provides for the use of inorganic salts, most preferably those discussed above, which ensure fractional reactions, e.g., by melt formation at predetermined temperatures and by the consumption of a relatively large amount of heat energy. The salts can also, however, enter into compounds with the plastics (in appropriate circumstances, like an alloy), the compound formation occurring with large consumption of heat and/or the compound itself melting with high heat comsumption. To this extent, the addition of a salt can be sufficient to effect the fractional, endothermic reactions to a sufficient extend (compound formation and melting or decomposition or the like).

BRIEF DESCRIPTION OF THE DRAWING

FIG. 1 is a cross section of an article made in according with one aspect of this invention.

DESCRIPTION OF THE PREFERRED EMBODIMENT

According to a preferred embodiment of the invention, ammonium phosphate, ammonium polyphosphate, an inorganic compound which yields water when heated, most preferably borax, anhydrous borax and a urea polymer, most effectively melamine, are particularly effective as a fire retardant additive for plastics. Urea can also be added, but the most important ingredients seem to be the foregoing.

The borax used is the decahydrate. Other inorganic compounds which yield water when heated are operable in the broadest sense of the invention. Hence, borax pentahydrate is operable. Boric acid is operable, since it loses water in stages as it is heated. However, borax decahydrate or a hydrate showing a comparable endothermic reaction upon releasing water is the most preferable component.

Indeed, the combination of borax decahydrate and anhydrous borax yields surprisingly effective results. Hence, this specific combination is especially preferred.

As indicated above, the most preferable urea polymer employed is melamine. However, other urea polymers can be substituted. Cyanurdiamide (ammeline) and cyanuramide (ammelide) and decyandiamide are examples.

The five main ingredients should have a relatively uniform particle size so that they can be thoroughly mixed together. To a point, a smaller particle size is preferred. However, one should not mill material such as the borax decahydrate too fine or one will drive out the water of hydration during the milling process.

The anhydrous borax typically has to be milled in a hammer mill until it will pass through a #325 screen. This is approximately the particle size at which the borax decahydrate is commercially available. Preferably, all of the particles of the five main ingredients should pass through #325 mesh screen, or in other words, be less than 10 microns in particle size.

Uniformity of particle size is important in insuring uniform cell size in blown plastic materials. The smaller particle sizes, i.e., less than 10 microns, are desirable for several reasons, not the least of which is that they have much less tendency to sink to the bottom of any plastic resin mixture. Also, the finer particle sizes tend to be more efficient, thereby enabling one to use less retardant material and still obtain the same fire retardant ratings. Finally, the smaller particles will have less tendency to clog automated processing and molding equipment.

None of the above ingredients are presently considered to be hazardous substances or carcinogenic. This is in sharp contrast to retardants such as antimony trioxide which is now considered highly suspect from a human factors standpoint.

In using the present invention in connection with plastic foams, it does appear important to avoid the use of water blown systems. The water causes the fire retardants to settle to the bottom of the foam during blowing, thereby leaving the upper portion of the foam component unprotected. Hence, freon blown systems or alternative nonwater blowing systems should be employed where the fire retardant of the present invention is used in a foamed plastic.

The presence of water does not appear detrimental to the performance of the fire retardant per se. Thus, the fire retardant of the present invention has been found very effective in water borne coatings, as for example aqueous coatings prepared in a vinylidene chloride latex binder.

The fire retardant must be thoroughly mixed with the plastic resin or other material whose fire retardancy it is to enhance. When mixing the fire retardant with a polyol in a polyurethane system, a 3000–4000 rpm mixer seems to be most effective in insuring a regular mixture and avoiding air bubbles. In any mixture, care must be taken to promptly use the composition and effect curing in order to prevent the fire retardant component from settling to the bottom of the material.

In foamed plastic systems, one must also take care to cure the system rapidly in order to prevent the foam from collapsing due to the increased weight added by the presence of the fire retardant. Hence, a so-called "hot cure" is preferred in order to maximize the speed of curing of the foam. A "hot cure" is typically effected by utilizing an external heat source such as an oven. The speed of curing can also be increased to some extent by increasing the amount of catalyst used in the system. This is applicable in either molded or free rise foam applications.

The present fire retardant can be used in conjunction with some other fire retardants. For example, it has been used in latex coatings in conjunction with intumescent additives. In such systems the fire retardant of the present invention may be desired as a thickener, as well as a fire retardant, in place of combustible organic thickeners.

However, care must be taken when mixing this retardant with other retardants. Some retardants currently used is urethane foams, for example, appear to inhibit the effectiveness of the present invention.

The invention can be implemented in an outstanding manner in building materials and seating of semi-hard to soft polyurethane foam. The use of such foams as a building material for building parts for the interior construction of spaces is known (DE-GM 75 30 775).

A particularly suitable recipe for a polyurethane building material (without the fire retardant of this invention) has the following components:
48 through 58, preferably 50 through 55, wt.% polyol
17 through 22, preferably 18 through 20, wt.% isocyanate (hardener)
0 through 1, preferably 0.2 through 0.6, wt.% accelerator, e.g., DBTL
15 through 50, preferably 20 through 30, wt.% blowing agent (Arkton).

On mixing these materials together there is known to arise a so-called semi-hard foam structure with a relatively dense outer skin. If the foaming is carried out in a mold supported on all sides, components are obtained with a foam core and relatively dense surface layers (DE-GM 75 30 775).

The fire retardant of the present invention is then mixed with the polyol in amounts sufficient to yield a final product in which the fire retardant is from about 20 to about 64% by weight of the overall composition. In polyurethane foam, 20% of the fire retardant by weight will cause the foamed product to have a Class II rating by accepted United States standards. 29% fire retardant in polyurethane foam will yield a Class I rating by the same standards. Further increases do not substantially improve fire retardancy, but may be desirable for other reasons, as for example to provide increased filler, increased thickening, increase stiffness and the like. In epoxy coatings, our fire retardant serves as a thickener and may eliminate in some applications the need for any additional thickeners.

The premix of the other reactants is then added and the mixture is processed in the usual way. A combination of additives consisting of ammonium polyphosphate, monoammonium phosphate, borax, anhydrous borax, and melamine is here preferred. The amounts added are regulated respectively according to the desired endothermic heats of reaction. The amounts of ammonium polyphosphate and anhydrous borax are selected such that these materials act as nucleating agents for the reaction products from monammonium phosphate and borax, and favor the desired reactions or hinder undesired reactions. The action of these materials even in small amounts, possibly as nucleating agents and/or catalysts or the like is surprising. Their addition leads to particularly good results in combination with the other stated materials.

In some applications, it has been found that as little as 15 to 20% fire retardant is extremely effective. Epoxy coating are an example of such an application.

It is particularly advantageous to add the additives in the following proportions to one another, i.e., based on the total amount of the additives:
2-10, preferably 5-8, wt.% ammonium polyphosphate
10-50, preferably 30-40, wt.% monoammonium phosphate
4-12, preferably 7-10, wt.% anhydrous borax
12-40, preferably 20-30, wt.% borax
12-40, preferably 20-30, wt.% melamine
0-20, preferably 5-10, wt.% urea.

Dispersion of the additives takes place, according to a further embodiment of the invention, with the addition of pyrogenic, hydrophobic, and in particular siliconated, silicic acid. It is also advantageous to mix in a silane or silicone or to add a stearate or another hydrophobizing medium. The silicic acid is preferably added in amounts of 0.1-2.5 wt.%, based on the amount of additives. Because of a considerable improvement in dispersibility, hydrophobizing also acts to improve the flowability of the additives when they are mixed in and to improve the stability properties during storage. In addition hydrophobizing is effected and counters entry of water during foam formation, which is problematical in particular in the production of a polyurethane foam.

A further process variant according to the invention proposes the addition of diluents which are preferably neutral to the reaction, for example alcohols, preferably n-butanol or methylene chloride, up to about 50 wt.% of the premix, so that the processability of the mixture is improved by liquefaction. The structure and properties, e.g., the elasticity, can also be influenced. Methylene chloride also acts here in an advantageous manner as a blowing agent.

The new flameproof polyurethane foam is in particular suitable for the production of plate-form cushioning components, handrails, sound absorbent panels according to DE-GM 75 30 775, and wall protection strips. The properties of the new building material are substantially unchanged, apart from inflammability, in comparison with the conventional building materials; the additives have produced no substantial negative effects. The structure of the new building material of the building components is characterized by the presence of the additives in the solid webs and the surface layers. The additives are analyzable and hence sufficiently individualized. The choice of material conditions in a surprising manner the particular applicability of the building components as flameproof building elements.

A building component according to the invention is explained in more detail with reference to the drawing. The illustration shows a part of a cushioning panel, which in particular also has notable sound insulating properties.

The panel has a highly elastic core 1 of foamed polyurethane, consisting of predominantly closed spherical cells 2 and the solid webs 3. The surface layers 4 and 5 are relatively densely structured, likewise consist of polyurethane, and are materially integrally connected to the core 1. Holes 6 can be stamped or bored or the like through the surface layer 4 into the core 1, and serve to absorb sound. It is important that the solid webs 3 contain the additives, which are schematically shown as points 7. It is also important that if closed cell plastic foams, rather than open cell are used, holes should be provided which open at the surface of the foam structure in order to facilitate degassing, i.e., the escape of gases, when the structure is heated.

The invention is clarified below by means of examples.

EXAMPLE 1

A basic mixture, consisting of
53.0 wt.% polyol
20.0 wt.% isocyanate
0.4 wt.% accelerator
17.6 wt.% Freon blowing agent,
from which the foam building components can be produced which do not correspond to the conditions of Class B1 of DIN 4102, had approximately equal amounts of the following additive formulation mixed into it, the additives being added to the polyol:
7 wt.% ammonium polyphosphate
35 wt.% monoammonium phosphate
25 wt.% borax
8 wt.% anhydrous borax
25 wt.% melamine.

Foaming occurred in a mold supported on all sides, so that cushioning panels with the dimensions 100 cm × 19 cm × 2 cm resulted. Four panels were subjected to the test conditions according to West German standard DIN 4102, Part 1, point 6.1.2, with the result that the residual length in the middle was 17 cm and only a maximum gas temperature of 139° C. occurred, so that the conditions for a building material B1 according to DIN 4102 were fully fulfilled.

EXAMPLE 2

The formulations for polyurethane foam and fire retardant as set forth in Example 1 above were substantially the same for Example 2. However, the first retardant comprised only 29% of the composition by weight rather than 50% by weight as in Example 1. The resulting foam yielded a Class I rating in accordance with accepted United States fire retardant standards. This rating is determined in accordance with an ASTM test known as the "Butler Chimney Test." The test sample is suspended in a cylinder and is exposed to a Bunsen burner flame at 700° F. Once the test sample is ignited, the material is pulled away and the following are measured:
(1) The height of the flame in the chimney after the burner is pulled away;
(2) The amount of smoke generated after the burner is pulled away; and
(3) The amount of weight loss in the sample after burning has ceased.

EXAMPLE 3

The materials of Examples 1 and 2 were utilized, but only 20% by weight of fire retardant was employed in the overall resulting foam. The material achieved a Class II rating in accordance with accepted United States fire retardant standards, as determined by the "Butler Chimney Test" described in Example 2.

EXAMPLE 4

Approximately 20% by weight of fire retardant was introduced into an epoxy coating composition. A small patch was painted onto a substrate and allowed to cure. The coated substrate was placed at one end of a four foot tunnel and then subjected to an exposed blow torch flame and wind in order to determine how far flame from the epoxy would spread down the tunnel. No flame spread occured. There was also a drastic reduction in smoke and no off-gasses were given off as is the case when brominated chemicals are used as fire retardants.

EXAMPLE 5

The procedure of Example 4 was repeated with a polyester coating containing approximately 20% of the fire retardant of Example 1. The polyester material included glass fibers since it is a typical fiberglass patch formulation. Again, no flame spread resulted during the test period.

EXAMPLE 6

A flexible urethane foam containing 29% by weight of fire retardant in accordance with the present invention was subjected to Underwriters Laboratory Test #94 for flame retardancy. In this test, a 1"×6"×⅛" strip is suspended over a Bunsen burner for 10 seconds and is then removed from the flame and timed to determine how long it will continue burning until it self-extinguishes. Our sample did not even ignite when exposed to the flame. No burning occured at all.

EXAMPLE 7

The procedure of Example 6 was repeated only on a sample of rigid urethane foam containing approximately 29% by weight of the fire retardant in accordance with the present invention. This sample did ignite when exposed to flame, but no burning continued after the sample was removed from the Bunsen burner flame.

EXAMPLE 8

In this test, the so-called "O.I." test, a 1"×½"×6" piece of flexible urethane foam containing 29% by weight of fire retardant in accordance with the present invention was placed in a cylinder which is purged with nitrogen. An open flame is then held over the product and oxygen is introduced into the system until ignition is achieved. A plastic material, such as a flexible foam, is considered acceptable, if a measure of 17 on the "O.I." test scale is achieved. The flexible foam sample made in accordance with the present invention did not ignite. The scale does not exceed 50 and hence the test was discontinued at this point with the sample still in tact.

EXAMPLE 9

The "O.I." test of Example 8 was repeated with a rigid polyurethane sample containing approximately 29% by weight of the fire retardant of the present invention. Ignition did not occur until the oxygen level reached approximately 36 on the "O.I." test scale.

EXAMPLE 10

A flexible urethane foam containing approximately 29% by weight of fire retardant was subjected to a radiant panel test. In this test, a panel is heated to 1000° F. and a 3"×3"×1" sample of foam is placed in front of the panel for 10 minutes. The sample is then subjected to three small propane flames at 1700° F. each. The time which it takes for the burning of the samples to stabilize, as determined by rate of smoke emission, and the amount of unburned sample then remaining are then determined. In the optimum prior result of which we are aware, the material stabilized at 10 minutes and was 100% consumed by the conflagration. Our test sample stabilized at 15 minutes, at which time there was still in excess of 50% of undamaged foam left in the sample.

EXAMPLE 11

An epoxy coating was prepared containing 20% by weight fire retardant made in accordance with this invention. A substrate was coated and the coating cured at unusually high temperatures, i.e., 450° F. The epoxy did not ignite or degrade in any way during this curing.

After curing, the sample was heated in a 550° F. oven for twenty minutes. No ignition or degradation occurred.

CONCLUSION

It is surprising that the addition of salts and the other stated materials leads to reactions under the action of high temperatures, consuming obviously larger amounts of heat than the additives require for melting or decomposition or the like, and that flameproofness can thus be achieved. An explanation has not yet been found for this unexpected property of the new plastics, because, e.g., the melting points or decomposition points of some of the stated additives lie much higher than the temperature stages of the corresponding fractional reactions according to the invention. The material made with the present fire retardant seems to develop an insulating carbon char which helps the material resist further degradation and thereby further exposure to flame. A plastic foam for example, which contains this fire retardant resists melting when exposed to heat. So-called "fall out" of burning or hot material is thereby minimized.

There is a major reduction in gaseous by-products, i.e., "off-gases," and smoke when the present fire retardant is used, as compared to other retardants. The brominated retardants give off considerable gaseous by-products for example. Further, the smoke resulting from using the present invention is white, not thick and black. In part the reduction in smoke and off-gases is a result of the nature of the fire retardant per se, and in part because of the significant reduction in combustion of the component which has been fireproofed.

Besides the action, as described above, of the said mixtures of additives on plastics, the same action also occurs on synthetic resins such as, for example, epoxy resins, vinyls and latex products such as, e.g., latex paints, other paints and also in strains applied to wood building materials. Indeed, the fire retardant per se of the present invention can be incorporated directly into the body of so-called pressed wood, also known as chipboard. The fire resistance of the resulting board is significantly increased.

Naturally in utilizing the fire retardant of the present invention in various different compositions, other processing adjustment may have to be made to accommodate the changes in the nature of the material being processed. For example, when the fire retardant of the present invention is used in a polyurethane material, the material tends to be more viscous. This may require one to alter the pump, for pumping the material to a nozzle, from a rotary pump to a rotary screw pump. Larger ports and larger hoses may have to be provided to accommodate the polyol with the fire retardant in it. These facts will, of course, be apparent to those skilled in the art.

It will also be appreciated by those skilled in the art that changes and modifications of the preferred embodiments can be made without departing from the spirit and broader aspects of the invention as set forth in the appended claims.

The embodiments of the invention in which an exclusive property or privilege is claimed are defined as follows:

1. A fire retardant plastic comprising:
    a plastic resin composition combined with monoammonium phosphate, ammonium polyphosphate, an inorganic compound which releases water when heated, an anhydrous inorganic compound capable of hydration, and a urea polymer.

2. The fire retardant plastic of claim 1 wherein said anhydrous inorganic compound is anhydrous borax.

3. The fire retardant plastic of claim 1 in which said inorganic compound which releases water when heated is selected from the group consisting of borax decahydrate, borax pentahydrate and boric acid.

4. The fire retardant plastic according to claim 1 in which said inorganic compound which releases water is borax decahydrate.

5. The fire retardant plastic of claims 1, 3 or 4 wherein said chemicals comprise from about 15 to about 64% of the overall plastic composition.

6. The fire retardant plastic of claim 5 wherein said chemicals as a separate additive are in the following proportion relative to one another;
    from about 2 to about 10% by weight of said ammonium polyphosphate;
    from about 10 to about 50% by weight of said monoammonium phosphate;
    from about 4 to about 12% by weight of said anhydrous borax;
    from about 12 to about 40% by weight of said borax; and
    from about 12 to about 40% by weight of said urea polymer.

7. The fire retardant plastic of claim 6 wherein said chemicals as a separate additive are in the following proportion relative to one another;
    from about 5 to about 8% by weight of said ammonium polyphosphate;
    from about 30 to about 40% by weight of said monoammonium phosphate;
    from about 7 to about 10% by weight of said anhydrous borax;
    from about 20 to about 30% by weight of said borax; and
    from about 20 to about 30% by weight of said urea polymer.

8. The fire retardant plastic of claims 1, 3 or 4 wherein said chemicals as a separate additive are in the following proportion relative to one another;
    from about 2 to about 10% by weight of said ammonium polyphosphate;
    from about 10 to about 50% by weight of said monoammonium phosphate;
    from about 4 to about 12% by weight of said anhydrous borax;
    from about 12 to about 40% by weight of said borax; and
    from about 12 to about 40% by weight of said urea polymer.

9. The fire retardant plastic of claim 8 wherein said chemicals as a separate additive are in the following proportion relative to one another;
    from about 5 to about 8% by weight of said ammonium polyphosphate;

from about 30 to about 40% by weight of said monoammonium phosphate;
from about 7 to about 10% by weight of said anhydrous borax;
from about 20 to about 30% by weight of said borax; and
from about 20 to about 30% by weight of said urea polymer.

10. The fire retardant plastic according to claim 9 wherein said urea polymer is selected from the group consisting of melamine, cyanuramide, cyanurdiamide and dicyandiamide.

11. The fire retardant plastic according to claim 8 wherein said urea polymer is selected from the group consisting of melamine, cyanuramide, cyanurdiamide and dicyandiamide.

12. The fire retardant plastic according to claim 7 wherein said urea polymer is selected from the group consisting of melamine, cyanuramide, cyanurdiamide and dicyandiamide.

13. The fire retardant plastic accordin to claim 6 wherein said urea polymer is selected from the group consisting of melamine, cyanuramide, cyanurdiamide and dicyandiamide.

14. The fire retardant plastic according to claims 1, 3 or 4 wherein said urea polymer is selected from the group consisting of melamine, cyanuramide, cyanurdiamide and dicyandiamide.

15. A fire retardant plastic accordin to claim 10 wherein said plastic resin composition is a plastic foam.

16. A fire retardant plastic according to claim 15 characterized in that said plastic resin composition is a polyurethane foam composition.

17. The fire retardant plastic of claim 16 wherein said foam is generated using a nonaqueous blowing system.

18. The fire retardant plastic according to claim 10 which additionally includes urea in an amount relative to said chemicals only of from 0 to about 20% by weight.

19. The fire retardant plastic of claim 18 wherein said proportion of said urea is from about 5 to about 10% by weight.

20. A fire retardant plastic according to claim 18 characterized in that it contains added pyrogenic, siliconated silicic acid.

21. The fire retardant plastic of claims 1, 3, or 4 wherein said chemicals are approximately 10 microns or less in particle size.

22. The fire retardant plastic of claim 5 wherein said chemicals are approximately 10 microns or less in particle size.

23. The fire retardant plastic of claim 6 wherein said chemicals are approximately 10 microns or less in particle size.

24. The fire retardant plastic of claim 7 wherein said chemicals are approximately 10 microns or less in particle size.

25. The fire retardant plastic of claim 8 wherein said chemicals are approximately 10 microns or less in particle size.

26. The fire retardant plastic of claim 9 wherein said chemicals are approximately 10 microns or less in particle size.

27. A process for the production of a fire retardant plastic wherein a plastic is mixed with the following chemicals: monoammonium phosphate, ammonium polyphosphate, an inorganic compound which releases water when heated, an anhydrous inorganic compound capable of hydration, and a urea polymer.

28. The process of claim 27 in which said anhydrous inorganic compound is anhydrous borax.

29. The process according to claim 28 in which said inorganic compound which releases water when heated is selected from the group consisting of borax decahydrate, borax pentahydrate and boric acid.

30. The process according to claim 29 in which said inorganic compound which releases water is borax decahydrate.

31. The process according to claim 30 characterized in that said urea polymer is selected from the group consisting of melamine, cyanurdiamide, cyanuramide and dicyandiamide.

32. The process according to claim 31 characterized in that pyrogenic, siliconated silicic acid is added to the premix.

33. The process according to claim 32 characterized in that an alcohol is added to the total mixture to facilitate fluidization.

34. The process according to claim 33 characterized in that methylene chloride is added to the basic mixture.

35. The process according to claim 30 wherein said chemicals are approximately 10 microns or less in particle size.

36. The process according to claim 30 characterized in that said chemicals comprise a premix of the following proportions with respect to one another:
from about 2 to about 10 wt.% ammonium polyphosphate
from about 10 to about 50 wt.% monoammonium phosphate
from about 4 to about 12 wt.% anhydrous borax
from about 12 to about 40 wt.% said inorganic compound which releases water when heated
from about 12 to about 40 wt.% of said urea polymer.

37. The process according to claim 36 wherein sufficient premix is added to the remaining ingredients to comprise from about 15 to about 64% by weight of the total composition.

38. The process according to claim 37 wherein the proportions in said premix are as follows:
from about 5 to about 8% by weight of said ammonium polyphosphate;
from about 30 to about 40% by weight of said monoammonium phosphate;
from about 7 to about 10% by weight of said anhydrous borax;
from about 20 to about 30% by weight of said inorganic compound which releases water when heated; and
from about 20 to about 30% by weight of said urea polymer.

39. The process according to claim 36 wherein the proportions in said premix are as follows:
from about 5 to about 8% by weight of said ammonium polyphosphate;
from about 30 to about 40% by weight of said monoammonium phosphate;
from about 7 to about 10% by weight of said anhydrous borax;
from about 20 to about 30% by weight of said inorganic compound which releases water when heated; and
from about 20 to about 30% by weight of said urea polymer.

40. The process according to claim 39 wherein said urea polymer is selected from the group consisting of melamine, cyanuramide, cyanurdiamide and dicyandiamide.

41. The process according to claim 38 wherein said urea polymer is selected from the group consisting of melamine, cyanuramide, cyanurdiamide and dicyandiamide.

42. The process according to claim 40 wherein said premix additionally includes from about 0 to about 20% by weight of urea.

43. The process according to claim 42 wherein said amount of said urea is from about 5 to about 10% by weight.

44. The process of claim 40 wherein the plastic is a polyurethane foam comprising a polyol as the resin, isocyanate and an accelerator.

45. The process of claim 44 wherein said premix comprises said additive mixture mixed with the polyol prior to adding either to the remaining ingredients of the plastic and is mixed with a mixer at approximately 3000 to 4000 rpm.

46. The process according to claim 36 wherein said urea polymer is selected from the group consisting of melamine, cyanuramide, cyanurdiamide and dicyandiamide.

47. The process according to claim 38 wherein the plastic used is a foam and a nonaqueous blowing system is used to generate the foam.

48. The process of claim 47 wherein the plastic is a polyurethane foam comprising a polyol as the resin, isocyanate and an accelerator.

49. The process of claim 48 wherein said premix comprises said additive mixture mixed with the polyol prior to adding either to the remaining ingredients of the plastic.

50. The process according to claim 49 wherein said chemicals are approximately 10 microns or less in particle size.

51. The process according to claim 37 wherein the plastic used is a foam and a nonaqueous blowing system is used to generate the foam.

52. The process of claim 51 wherein the plastic is a polyurethane foam comprising a polyol as the resin, isocyanate and an accelerator.

53. The process of claim 52 wherein said premix comprises said additive mixture mixed with the polyol prior to adding either to the remaining ingredients of the plastic.

54. The process according to claim 36 used is a foam and a nonaqueous blowing system is used to generate the foam.

55. The process of claim 54 wherein the plastic is a polyurethane foam comprising a polyol as the resin, isocyanate and an accelerator.

56. The process of claim 55 wherein said premix comprises said additive mixture mixed with the polyol prior to adding either to the remaining ingredients of the plastic.

57. The process of claim 56 wherein said chemicals are approximately 10 microns or less in particle size.

58. The process according to claim 36 characterized in that pyrogenic, siliconated silicic acid is added to the premix.

59. The process according to claim 58 characterized in that an alcohol, preferably n-butanol, is added to the total mixture to facilitate fluidization.

60. The process according to claim 59 characterized in that methylene chloride is added to the basic mixture.

61. A fire retardant additive comprising:
monoammonium phosphate;
ammonium polyphosphate;
an inorganic compound which releases water when exposed to heat;
an anhydrous inorganic compound capable of hydration; and a
urea polymer.

62. The fire retardant additive of claim 61 in which said anhydrous inorganic compound is anhydrous borax.

63. A fire retardant additive of claim 62 in which said inorganic compound which releases water when heated is selected from the group consisting of borax decahydrate, borax pentahydrate and boric acid.

64. A fire retardant additive of claim 63 in which said inorganic compound is borax decahydrate.

65. A fire retardant additive of claim 64 characterized in that said urea polymer is selected from the group consisting of melamine, cyanurdiamide, cyanuramide and dicyandiamide.

66. A fire retardant additive of claim 63 characterized in that said urea polymer is selected from the group consisting of melamine, cyanurdiamide, cyanuramide and dicyandiamide.

67. A fire retardant additive of claim 62 characterized in that said urea polymer is selected from the group consisting of melamine, cyanurdiamide, cyanuramide and dicyandiamide.

68. A fire retardant additive of claim 61 characterized in that said urea polymer is selected from the group consisting of melamine, cyanurdiamide, cyanuramide and dicyandiamide.

69. A fire retardant additive of claim 61 in which said inorganic compound which releases water when heated is selected from the group consisting of borax decahydrate, borax pentahydrate and boric acid.

70. A fire retardant additive of claim 61 or 69 in which said inorganic compound is borax decahydrate.

71. The first retardant additive of claim 70 which comprises from about 2 to about 10% by weight of said ammonium polyphosphate;
from about 10 to about 50% by weight of said monoammonium phosphate;
from about 4 to about 12% by weight of said anhydrous inorganic compound;
from about 12 to about 40% by weight of said inorganic which releases water when exposed to heat; and
from about 12 to about 40% by weight of said urea polymer.

72. The fire retardant according to claim 71 wherein said amounts are as follows:
from about 5 to about 8% by weight of said ammonium polyphosphate;
from about 30 to about 40% by weight of said monoammonium phosphate;
from about 7 to about 10% by weight of said anhydrous inorganic compound;
from about 20 to about 30% by weight of said inorganic compound which releases water when heated; and
from about 20 to about 30% by weight of said urea polymer.

73. The fire retardant of claim 72 wherein said chemicals are approximately 10 microns or less in particle size.

74. The fire retardant of claim 71 wherein said chemicals are approximately 10 microns or less in particle size.

75. The fire retardant of claim 70 wherein said chemicals are approximately 10 microns or less in particle size.

76. The fire retardant of claim 75 which additionally includes from about 0 to about 20% by weight urea.

77. The fire retardant of claim 76 wherein said urea is present in an amount of from about 5 to about 10% by weight.

78. The fire retardant of claim 76 which further includes from about 0.1 to about 2.5% by weight of pyrogenic, siliconated silicic acid.

79. The fire retardant additive of claim 78 which includes as much as about 50% by weight of one of the following:
alcohols, methylene chloride or mixtures thereof.

80. The fire retardant of claim 71 which additionally includes from about 0 to about 20% by weight urea.

81. The fire retardant of claim 80 wherein said urea is present in an amount of from about 5 to about 10% by weight.

82. The fire retardant of claim 71 which further includes from about 0.1 to about 2.5% by weight of pyrogenic, siliconated silicic acid.

83. The fire retardant additive of claim 82 which includes as much as about 50% by weight of one of the following:
alcohols, methylene chloride or mixtures thereof.

84. The fire retardant additive of claim 71 which includes as much as about 50% by weight of one of the following:
alcohols, methylene chloride or mixtures thereof.

85. The process of claim 33 in which said alcohol comprises n-butanol.

86. The fire retardant additive of claim 79, 83 or 84 in which said alcohol comprises n-butanol.

87. The fire retardant plastic of claim 15 wherein said foam is generated using a nonaqueous blowing system.

* * * * *

UNITED STATES PATENT AND TRADEMARK OFFICE
CERTIFICATE OF CORRECTION

PATENT NO. : 4,438,028
DATED : March 20, 1984
INVENTOR(S) : Hans-Bernd Schmittmann It is certified that error appears in the above-identified patent and that said Letters Patent is hereby corrected as shown below:

On the title page

Abstract, line 2:

"making for" should be --for making--

Column 1, line 23:

"ageing" should be --aging--

Column 3, line 42:

"comsumption" should be --consumption--

Column 3, line 44:

"extend" should be --extent--

Column 8, line 1:

"occured" should be --occurred--

Column 8, lines 46 and 47:

"in tact" should be --intact--

Column 8, line 2:

"off-gasses" should be --off-gases--

UNITED STATES PATENT AND TRADEMARK OFFICE
CERTIFICATE OF CORRECTION

PATENT NO. : 4,438,028
DATED : March 20, 1984
INVENTOR(S) : Hans-Bernd Schmittmann It is certified that error appears in the above-identified patent and that said Letters Patent is hereby corrected as shown below:

Column 10, Claim 3, line 14:

"1" should be --2--

Column 10, Claim 4, line 18:

"1" should be --3--

Column 10, Claim 5, line 21:

after "1," insert --2--

Column 10, Claim 8, line 50:

after "1," insert --2--

Column 11, Claim 14, line 25:

after "1," insert --2--

Column 11, Claim 21, line 46:

after "1," insert --2--

Column 11, Claim 13, line 21:

"accordin" should be --according--

UNITED STATES PATENT AND TRADEMARK OFFICE
CERTIFICATE OF CORRECTION

PATENT NO. : 4,438,028
DATED : March 20, 1984
INVENTOR(S) : Hans-Bernd Schmittmann It is certified that error appears in the above-identified patent and that said Letters Patent is hereby corrected as shown below:

Column 11, Claim 15, line 29:

"accordin" should be --according--

Column 14, Claim 71, line 51:

before "which" insert --compound--

Signed and Sealed this

*Fourteenth* Day of *August 1984*

[SEAL]

*Attest:*

*Attesting Officer*

GERALD J. MOSSINGHOFF

*Commissioner of Patents and Trademarks*